United States Patent Office 3,517,054
Patented June 23, 1970

3,517,054
PROCESS FOR PREPARING MONOACETIN FROM PROPYLENE
Arthur D. Ketley, Silver Spring, Md., assignor to W. R. Grace & Co., New York, N.Y., a corporation of Connecticut
No Drawing. Filed Dec. 5, 1967, Ser. No. 688,012
Int. Cl. C07c 67/00, 67/04
U.S. Cl. 260—491         8 Claims

ABSTRACT OF THE DISCLOSURE

In abstract, this invention is directed to a process for preparing monoacetin from propylene, said process comprising forming allyl acetate from propylene by catalytically reacting gaseous propylene with acetic acid vapor in the presence of a catalyst and gaseous oxygen, separating the allyl acetate, and forming monoacetin by dissolving the allyl acetate in an acid selected from the group consisting of formic acid and acetic acid, treating the resulting solution with hydrogen peroxide and recovering the monoacetin, all as recited hereinafter.

---

This invention is in the field of monoacetin preparation, said monoacetin being prepared from propylene with allyl acetate being an intermediate product.

U.S. Pat. 3,275,680 discloses a prior art process for preparing allyl acetate from propylene, and U.S. Pat. 3,169,139 discloses a prior art process for hydroxylating certain esters of olefinic higher fatty acids.

In summary, this invention is directed to a process for preparing monoacetin from propylene, said process comprising forming a second mixture consisting essentially of allyl acetate and unreacted feedstuff by passing a first gaseous mixture of feedstuff, said feedstuff consisting essentially of about 10–70 parts by volume of propylene, 10–70 parts by volume of acetic acid, and 1–20 parts by volume of oxygen, over a catalyst, said catalyst consisting essentially of about 0.5–8% of a Group VIII noble metal deposited on a support which has been treated with a basic material selected from the group consisting of alkali metal hydroxides, alkali metal alkoxides, alkali metal oxides, and alkali metal salts of fatty acids having from one to six carbon atoms, said support being selected from the group consisting of titanium oxide and alumina-titania, while maintaining the catalyst at about 50–250° C.; (b) separating allyl acetate from the second mixture; (c) forming a third mixture by adding the separated allyl acetate to an acid selected from the group consisting of formic acid and acetic acid, said allyl acetate being added at a rate of about 0.25–10 moles per liter of said acid; (d) forming of fourth mixture by adding an aqueous hydrogen peroxide solution analyzing about 10–70% $H_2O_2$ to the third mixture, said aqueous hydrogen peroxide being added at a rate to provide about 25–500 grams of $H_2O_2$ per mole of allyl acetate present in said third mixture; (e) forming a fifth mixture, said fifth mixture consisting essentially of monoacetin, an acid selected from the group consisting of formic acid and acetic acid, water, and peroxide by maintaining the fifth mixture at about 0–100° C. for about 0.25–24 hours; and (f) separating and recovering the monoacetin.

In preferred embodiments of the invention set forth in the above summary:
(1) The noble metal is palladium;
(2) The first gaseous mixture is passed over the catalyst at a gaseous hourly space velocity of about 500–5000 liters, measured at 25° C. and 1 atmosphere absolute, per liter of catalyst;

(3) The first gaseous mixture consists essentially of about 40–60 parts by volume of propylene, 40–60 parts by volume of acetic acid vapor, and 5–15 parts by volume of oxygen;
(4) The catalyst is maintained at about 100–150° C.;
(5) The allyl acetate is added to an acid selected from the group consisting of formic acid and acetic acid at a rate of about 0.5–2 moles per liter of said acid;
(6) The hydrogen peroxide is added to the third mixture at a rate to provide about 100–150 grams of $H_2O_2$ per mole of allyl acetate present in the third mixture; and
(7) The fourth mixture is maintained at about 20–40° C. for about 0.25–24 hours.

U.S. Pat. 3,275,680 discloses the preparation of allyl alcohol from propylene by a process comprising the catalytic reaction of propylene oxygen (air), and potassium acetate in the presence of water.

The catalyst used in said process was finely divided palladium on a support produced from alumina and bentonite. Ten percent of the reacted propylene was converted to acetone.

The instant invention which involves two steps, the first being the formation of allyl acetate from propylene, oxygen, and acetic acid—the second being the formation of monoacetin from the allyl acetate by treating the allyl acetate with hydrogen peroxide in the presence of formic acid or acetic acid constitutes a substantial and completely unobvious technical advance over the prior art because; (a) in the first step of the process of the instant invention, as established by vapor phase chromatography, no organic product other than allyl acetate is produced; and (b) the second step of said process provides a direct route from allyl acetate to monoacetin.

Monoacetin prepared by the process of the instant invention is an intermediate in the synthesis of glycerin (glycerol) which finds use as a polyol in the preparation of polyester resins, including alkyl resins, as a starting material for the manufacture of "nitroglycerine" (glycerol trinitrate) a powerful explosive, and as an antifreeze, and as a sugar substitute.

It is an object of this invention to provide a process for preparing monoacetin from propylene and acetic acid.

It is another object of this invention to provide a process for preparing allyl acetate from propylene via a route which does not form organic products other than allyl acetate.

Other objects will, on the basis of the disclosure presented in this specification, be readily apparent to those skilled in the art.

Noble metals which have given excellent results in the process of the instant invention are ruthenium, rhodium, palladium, iridium, osmium, and platinum.

Catalysts which have given excellent results in the process of this invention have been prepared by the following general procedure:

(1) Particulate titanium dioxide is reacted with an excess of basic material (e.g. alkali metal hydroxides, alkali metal alkoxides, alkali metal oxides, and alkali metal salts of fatty acids having 1–6 carbon atoms)—potassium hydroxide being a preferred basic material.

(2) The basic material-treated titanium dioxide is pelletized and calcined at a temperature of from about 300 to about 500° C. for a period of at least one hour.

(3) The calcined $TiO_2$ pellets are impregnated with a solution (e.g., a methanol-water solution, 40–60 parts by volume methanol, plus 60–40 parts by volume water)

of a soluble salt of a Group VIII noble metal—palladium nitrate being a preferred salt.

(4) The Group VIII noble metal salt impregnated pellets are dried and subjected to hydrogen reduction for a sufficient time to reduce the noble metal salt to metal.

The above catalyst composition, when placed in reactive contact with mixed vapors of propylene, oxygen, and acetic acid at a temperature of about 50–250° C. and pressures about 1–10 atmospheres absolute, was found to be capable of continuously producing substantial yields of allyl acetate for extended periods.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I (PREPARATION OF CATALYST)

The following procedure was used to prepare an excellent catalyst (Catalyst II) for use in the process of the instant invention.

Pulverized titanium dioxide (97% anatase, 3% rutile) was soaked in 10% sodium hydroxide solution at room temperature for about 18 hours, filtered, washed thoroughly with water and dried in the vacuum oven at 110° C. The treated powder was mixed with 3% by weight of Sterotex binder (a hydrogenated vegetable oil product used as an aid in forming catalyst pellets on a pelleting machine obtained from Capitol City Product Co., Columbus, Ohio) and compressed to ⅛″ x ⅛″ pellets. The binder was removed by calcining the pellets at 500° C. for one hour. Analysis of the base treated and washed titania gave a value of 0.05 weight percent sodium.

A solution containing 15 g. of palladium nitrate in 34 ml. of a mixture of 55% by volume methyl alcohol and 45% by volume water was stirred with 144 g. of the pelleted titania described above. The impregnated pellets were allowed to dry in the air for about 18 hours and then heated in a vacuum oven at 110° C. for 2 hours. The deposited palladium nitrate was reduced to the metal by passing hydrogen over the dried pellets for 6 hours at 150–175° C. The resulting catalyst was recovered and analyzed. It was found to contain 4% palladium.

EXAMPLE II (preparation of catalyst)

The following procedure was used to prepare an excellent catalyst (Catalyst II) for use in the process of the instant invention.

Pulverized titanium dioxide was mixed with 3% by weight of Sterotex binder and compressed to ⅛″ x ⅛″ pellets. The binder was removed by calcining the pellets at 500° C. for one hour.

A solution containing 15 g. of palladium nitrate in 34 ml. of 55% methyl alcohol was stirred with 144 g. of the pelletized titanium dioxide described above. The impregnated pellets were allowed to dry in the air for about 18 hours and then heated in a vacuum oven at 110° C. for 2 hours. The deposited palladium nitrate was reduced to metallic palladium with hydrogen. A stream of a mixture of hydrogen and nitrogen (ca. 50 mole percent hydrogen) was passed over the palladium nitrate impregnated titanium dioxide for a period of about ½ hour while maintaining the temperature of said impregnated titanium dioxide at about 300–350° C. after which period the temperature of the impregnated titanium dioxide was increased to about 350–500° C. The hydrogen-nitrogen stream was then replaced with a stream of substantially pure hydrogen, and said substantially pure hydrogen was passed over the impregnated titanium dioxide for about ½ hour.

The thus treated pellets were soaked in 7% potassium hydroxide solution at room temperature for about 18 hours separated from the potassium hydroxide solution by filtration. The separated pellets were washed with deionized water until the wash water leaving the filter was substantially free of potassium hydroxide. The washed pellets were dried in a vacuum oven at about 110° C. at a pressure of about 20–30 mm. of mercury absolute. The resulting catalyst was recovered and analyzed. It was found to contain about 3.9% palladium.

EXAMPLE III (preparation of catalyst)

The following procedure was used to prepare an excellent catalyst (Catalyst III) for use in the process of the instant invention.

A catalyst was prepared by the general procedure of Example I; however, the procedure was modified by substituting a 10% solution of sodium acetate for the sodium hydroxide solution. The sodium acetate was allowed to remain on the catalyst (i.e., the catalyst was not washed after treating with the sodium acetate solution) to form a catalyst containing 7.3% sodium acetate.

EXAMPLE IV (preparation of catalyst)

The following procedure was used to prepare an excellent catalyst (Catalyst IV) for use in the process of the instant invention.

A catalyst was prepared by the general procedure of Example I; however, in this instance, the procedure was modified by replacing the titanium dioxide with a mixture of alumina and titanium dioxide (ca. 80% alumina and 20% titanium dioxide-titania).

EXAMPLE V (preparation of catalyst)

The following procedure was used to prepare an excellent catalyst (Catalyst V) for use in the process of the instant invention.

A catalyst was prepared by the general method of Example I; however, in this instance the procedure was modified by impregnating the titanium support with ruthenium chloride.

EXAMPLE VI (preparation of monoacetin)

A gaseous feedstuff mixture consisting essentially of gaseous propylene, acetic acid vapor, and gaseous oxygen mixed in a ratio of about 15.6 parts by volume propylene, 13.7 parts by volume acetic acid vapor, and 3 parts by volume oxygen was passed over a bed of Catalyst I at a gaseous hourly space velocity of about 9.69 liters per liter of catalyst while maintaining the catalyst at about 150° C. (gas and vapor volumes were corrected to 25° C. and 1 atmosphere absolute where calculating space velocity).

Condensable products were collected by passing the effluent through a water-cooled zone maintained at about 25° C. Analysis (vapor phase chromatography) showed that the thus produced condensate (Condensate A) consisted essentially of aqueous acetic acid (93.1%) and allyl acetate (6.9%) and no other organic products. The non-condensable material (i.e., material not condensed in the aforesaid water-cooled zone) consisted essentially of propylene. The space time yield (STY) of allyl acetate was 1.66 moles per liter of catalyst per hour. The activity of the catalyst showed no evidence of declining even after about 200 hours of use.

The allyl acetate present in Condensate A was separated by distilling through a 1 meter spinning band column.

A 10 gram portion of the thus separated allyl acetate was mixed with 100 ml. of substantially anhydrous formic acid in a 3 neck 250 ml. flask, said flask being provided with stirring means. The resulting formic acid-allyl acetate mixture was stirred and maintained at about room temperature (ca. 25° C.) while adding 12.5 grams of about a 30% aqueous hydrogen peroxide (i.e., said solution analyzed ca. 30% $H_2O_2$) thereto, said peroxide solution being added dropwise. The resulting peroxide-containing mixture was maintained at about 43° C. for about 5 hours after which time the formic acid and water were stripped off the resulting mixture at about 128 mm. of mercury absolute temperature while maintaining said resulting mixture at about 52–60° C., thereby to leave a residue. Nuclear magnetic resonance established that said residue consisted essentially of monoacetin. The conversion (one pass yield) of monoacetin was about 66% of theory based on allyl acetate fed into the 3 neck flask. The monoacetin was of excellent quality said monoacetin being an excellent material for saponification (or hydrolysis) to yield glycerine (glycerol).

EXAMPLE VII (preparation of monoacetin)

The general procedure of Example VI was repeated; however, in this instance, the gaseous feedstuff mixture consisted essentially of about 645 parts by volume of gaseous propylene, 330 parts by volume of acetic acid vapor, and 113 parts by volume of gaseous oxygen. The flow rate of gases feedstuff mixture was 1088 ml. per minute over a 50 ml. catalyst bed. The gaseous hourly space velocity was 3.26, and the STY was 1.29. No organic reaction product other than allyl acetate was recovered.

A 10 gram portion of the thus prepared allyl acetate was treated with hydrogen peroxide solution according to the general procedure of Example V; however, in this instance, formic acid was replaced with glacial acetic acid. The results obtained were indistinguishable from those obtained in Example V.

In four other runs the general procedure of Example V was repeated but modified by substituting other catalysts as shown in the following table for Catalyst I.

| Run No.: | Catalyst No. |
|---|---|
| VIII | II |
| V | III |
| X | IV |
| XI | V |

In each instance (Runs VIII through XI) no organic product other than allyl acetate was formed in detectable quantities by the reaction of propylene, acetic acid and oxygen in the presence of the respective catalyst, and in each instance, treating the thus formed allyl acetate with hydrogen peroxide solution produced monoacetin of excellent quality.

The term "gaseous feedstuff mixture" means mixtures of gaseous propylene, acetic acid vapor, and oxygen gas. Such mixtures can contain an inert gas (e.g., nitrogen or helium); such mixtures can also contain an inert vapor (e.g., steam).

The term "%" or "percent" means parts per hundred. Unless otherwise specified where used, "%" or "percent" means parts per hundred by weight, and, unless otherwise defined where used, the term "Parts" means parts by weight.

The term "alumina-titania (or titania-alumina) support" means a catalyst support consisting essentially of about 15–25 parts by weight titanium dioxide and about 75–85 parts by weight alumina.

I claim:
1. A process for preparing monoacetin from propylene, said process comprising:
   (a) forming a second mixture, said second mixture consisting essentially of allyl acetate and unreacted feedstuff by passing a first gaseous mixture of feedstuff, said feedstuff consisting essentially of about 10–70 parts by volume of propylene, 10–70 parts by volume of acetic acid, and 1–20 parts by volume of oxygen, over a catalyst consisting essentially of about 0.5–8% of a Group VIII noble metal deposited on a support which has been treated with a basic material selected from the group consisting of alkali metal hydroxides, alkali metal alkoxides, alkali metal oxides, and alkali metal salts of fatty acids having from one to six carbon atoms, said support being selected from the group consisting of titanium dioxide and alumina-titania, while maintaining the catalyst at about 50–250° C.;
   (b) separating allyl acetate from the second mixture;
   (c) forming a third mixture by adding the separated allyl acetate to an acid selected from the group consisting of formic acid and acetic acid, said allyl acetate being added at a rate of about 0.25–10 moles per liter of said acid;
   (d) forming a fourth mixture by adding an aqueous hydrogen peroxide solution analyzing about 10–70% $H_2O_2$ to the third mixture, said aqueous hydrogen peroxide being added at a rate to provide about 25–500 grams of $H_2O_2$ per mole of allyl acetate present in said third mixture;
   (e) forming a fifth mixture, said fifth mixture consisting essentially of monoacetin, an acid selected from the group consisting of formic acid and acetic acid, water, and peroxide by maintaining the fourth mixture at about 0–100° C. for about 0.25–24 hours; and
   (f) separating and recovering the monoacetin.

2. The process of claim 1 in which the noble metal is palladium.

3. The process of claim 1 in which the first gaseous mixture is passed over the catalyst at a gaseous hourly space velocity of about 100–10,000 liters, measured at 25° C. and 1 atmosphere absolute, per liter of catalyst.

4. The process of claim 1 in which the first gaseous mixture consists essentially of about 40–60 parts by volume of propylene, 40–60 parts by volume of acetic acid vapor, and 5–15 parts by volume of oxygen.

5. The process of claim 1 in which the catalyst is maintained at about 100–150° C.

6. The process of claim 1 in which the allyl acetate is added to an acid selected from the group consisting of formic acid and acetic acid at a rate of about 0.5–2 moles per liter of said acid.

7. The process of claim 1 in which the aqueous hydrogen peroxide is added to the third mixture at a rate to provide about 100–150 grams of $H_2O_2$ per mole of allyl acetate present in the third mixture.

8. The process of claim 1 in which the fourth mixture is maintained at about 20–40° C. for about 0.25–24 hours.

References Cited

UNITED STATES PATENTS

| 2,911,437 | 11/1959 | Keith | 260—491 |
| 3,169,139 | 2/1965 | D'Addicco | 260—491 |
| 3,275,680 | 9/1966 | Holzrichter et al. | 260—497 |
| 3,455,997 | 7/1969 | Eschinasi | 260—489 |

LORRAINE A. WEINBERGER, Primary Examiner

V. GARNER, Assistant Examiner

U.S. Cl. X.R.

252—430, 474; 260—497